L. S. STARRETT.
COMBINED GAGE AND LEVEL.
APPLICATION FILED FEB. 21, 1910.
1,202,114.
Patented Oct. 24, 1916.
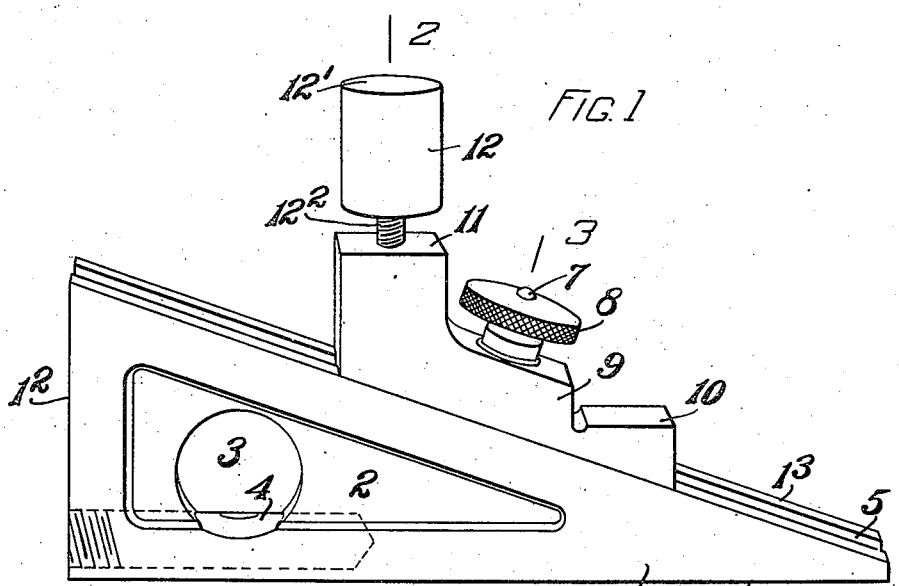
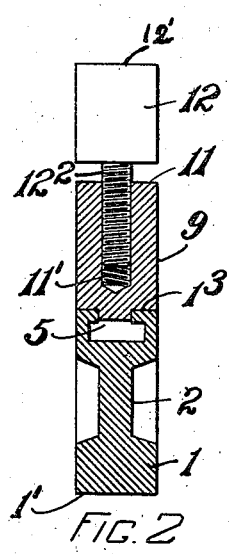
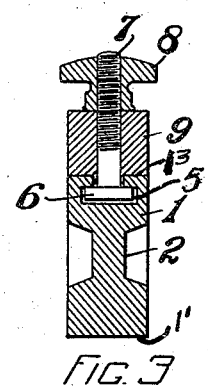
WITNESSES
L. D. Goodwin
R. B. Ellms.
INVENTOR
LAROY S. STARRETT
BY
ATTY

UNITED STATES PATENT OFFICE.

LAROY S. STARRETT, OF ATHOL, MASSACHUSETTS, ASSIGNOR TO L. S. STARRETT COMPANY, OF ATHOL, MASSACHUSETTS, A CORPORATION OF MASSACHUSETTS.

COMBINED GAGE AND LEVEL.

1,202,114.   Specification of Letters Patent.   Patented Oct. 24, 1916.

Application filed February 21, 1910. Serial No. 544,964.

*To all whom it may concern:*

Be it known that I, LAROY S. STARRETT, a citizen of the United States, residing at Athol, county of Worcester, Commonwealth of Massachusetts, have invented certain new and useful Improvements in Combined Gages and Levels, of which the following is a specification.

This invention relates to gages, and particularly to a combined gage and level. In working upon planers, milling machines or the like, it is very often necessary either to take a measurement from some part of the work to a cutter or from a planer bed to the cutter, or to adjust a cutter accurately at a certain distance from some part of the work. This part of the work may be a point difficult and generally inaccessible for ordinary measuring instruments, and it has therefore been much desired to have a gage which would meet conditions of that nature with accuracy. One of the difficulties in gaging this class of work has been in the liability of the gage to deviate from the right line. This frequently occurs where the face of the part upon which the gage rests is slightly out of the horizontal or is not perfectly smooth.

To the end, therefore, of providing a device which would be capable not only of taking accurate measurements, but also of indicating with absolute certainty the proper position of the gage to insure accuracy, I devised my present invention. In this I have combined, together with various features of vertical adjustability and adaptability to meet all conditions, a leveling feature which will insure the true positioning of the gage for accurate vertical measurement. This, together with various other features of construction, will be more fully described in the specification which follows.

In the drawings which form a part of the specification, I have shown as an illustrative embodiment a gage which I find well adapted to practical use. This I have described in the specification, employing corresponding reference numerals to indicate like parts throughout both specification and drawing.

In the drawing: Figure 1 is a side view of my gage, Fig. 2 is a section on the line 2—2, Fig. 1, and Fig. 3 is a section on the line 3—3, Fig. 1.

1 is a triangular frame having a central web 2 with an opening 3 in which a bubble level 4 is set to show the true horizontal position of the face $1^1$ or the true vertical position of the face $1^2$.

Face $1^3$ is slotted at 5 with a T slot in which the head 6 of a bolt 7 is guided.

8 is a milled locking nut of the bolt 7. This bolt 7 passes through a slide 9 on which are formed two steps or shoulders. The lower step 10 is below the level of the nut 8 and the upper step 11 slightly above the level of that nut.

12 is a removable post having a flat upper measuring surface $12^1$ and a threaded screw stem $12^2$ which engages a threaded socket $11^1$ tapped vertically through the face 11.

In operation my device is used as follows: Supposing that it is desired to measure the distance between the bottom of a slot and a planer edge, the gage would be set in the slot with its lower face 1' resting in the bottom thereof. By observing the bubble glass 4 it will be seen whether or not the gage has an absolutely true level, and whether or not the surfaces 10 and 11 or the top of the post 12, if that be in place, are perfectly parallel with the base of the gage. If this be true, then the distance between any one of these surfaces 10, 11 or $12^1$ and the base will be the true height which is sought to be measured. In running the gage under the work if it be desired to measure against either surface 10 or 11, the nut 8 is slacked and the slide 9 is run down on the inclined face $1^3$. The body $1^1$ is then positioned, as heretofore described, and the slide 9 pushed up the incline until either the surface 10 or 11 contacts with the upper surface to which the measure is to be made. If the distance to be measured is greater than the distance between the face 11 when the slide is at its highest position, the threaded post 12 may be screwed into the socket $11^1$. The post 12 may be adjusted to a variety of positions by moving it up or down in the threaded socket $11^1$. Obviously, a number of posts of various lengths will be provided to secure adjustment for different heights if desired.

After the adjustment of the gage it may be removed and measured by any suitable instrument such as a micrometer, thus giving the exact measurement required.

If it be desired to set a tool with reference to a surface, the gage is set by a micrometer, then placed under the cutter or other tool, with its base in true horizontal position, and the tool run down to contact with the surface on which the measurement has been made.

Various other modifications may be made in the structure or form of this device without departing from the spirit of my invention, if within the limits of the appended claims.

What I therefore claim and desire to secure by Letters Patent is:

1. A combination tool conbining the functions of a square and level and comprising a right triangular frame having level gaging faces on its two sides and a slideway on its hypotenuse, a slide on said slideway and having a pair of measuring shoulders having flat tops in different planes parallel to the base of said frame, a removable extension stud having a flat top, adjustably mounted on one of said shoulders and a level set in said frame parallel to its said base and to the shoulders of said slide and to the top of said extension stud.

2. A tool of the class described comprising a right triangular frame having a slideway on its hypotenuse and having a T-slot therealong, a slide on said slideway and having a pair of measuring shoulders of different heights parallel to the base of said frame and spaced apart, an inclined nut-bearing between said shoulders and parallel to said slideway, a headed bolt in said T-slot of said slideway and passing through said nut bearing at right angles thereto and a nut on said bolt and seated on said bearing.

3. A tool of the class described comprising a triangular frame having a flat base and a long inclined side, a pair of measuring shoulders adjustable along said inclined side and having flat tops disposed in different planes and both parallel to the base, a removable extension piece adjustably mounted on one of said shoulders, and a level set in said frame parallel to said base and to the shoulders of said slide and to the top of said extension piece, whereby said shoulders may be leveled in any position on said slideway.

4. A gage comprising a frame having a level base, a measuring member adjustable on said frame and parallel to said base and means for determining the horizontality of said base.

5. A gage comprising a right triangular frame, a measuring member adjustable on said frame, and means for determining the horizontality of the base of said frame and the verticality of the leg of said frame.

In testimony whereof I affix my signature in presence of two witnesses.

LAROY S. STARRETT.

Witnesses:
FRANK E. WING,
JENNIE F. WHEELER.